US009252688B2

(12) United States Patent
Diez Garias

(10) Patent No.: US 9,252,688 B2
(45) Date of Patent: Feb. 2, 2016

(54) ELECTROKINETIC NANOTHRUSTERS AND APPLICATIONS THEREOF

(71) Applicant: Rutgers, The State University of New Jersey, New Brunswick, NJ (US)

(72) Inventor: Francisco Javier Diez Garias, Piscataway, NJ (US)

(73) Assignee: RUTGERS, THE STATE UNIVERSITY OF NEW JERSEY, New Brunswick, NJ (US)

(*) Notice: Subject to any disclaimer, the term of this patent is extended or adjusted under 35 U.S.C. 154(b) by 550 days.

(21) Appl. No.: 14/024,043

(22) Filed: Sep. 11, 2013

(65) Prior Publication Data

US 2014/0070663 A1   Mar. 13, 2014

Related U.S. Application Data

(60) Provisional application No. 61/699,673, filed on Sep. 11, 2012, provisional application No. 61/748,177, filed on Jan. 2, 2013.

(51) Int. Cl.
*H02N 11/00* (2006.01)
*F03H 1/00* (2006.01)
*B63G 8/08* (2006.01)
*B63H 1/00* (2006.01)

(52) U.S. Cl.
CPC ............... *H02N 11/006* (2013.01); *B63G 8/08* (2013.01); *B63H 1/00* (2013.01); *F03H 1/0012* (2013.01)

(58) Field of Classification Search
CPC ........ F04B 19/16; F04B 19/006; F04B 17/00; F04B 19/00; F03H 99/00; F03H 1/0012; F03H 1/00; F03H 1/0037; F03H 1/0081; F03H 1/0087; F03H 1/0093; B64G 1/409; B01L 2400/0403; B01L 2400/0418; B63H 1/00; B63G 8/00; B63G 8/08; H02K 44/00; H02K 44/02
See application file for complete search history.

(56) References Cited

U.S. PATENT DOCUMENTS 6,881,039 B2 *   4/2005   Corbin .................. F04B 19/006
                                                              417/48
7,086,839 B2 *   8/2006   Kenny ..................... F04B 17/00
                                                              204/600

(Continued)

OTHER PUBLICATIONS

Bartsch, "Electrokinetically Pumped Liquid Propellant Microthrusters for Orbital Station Keeping", 2007, Solid-State Sensors, Actuators and Microsystems Conference, 2007. Transducers 2007. International.*

(Continued)

*Primary Examiner* — Phutthiwat Wongwian
*Assistant Examiner* — William Breazeal
(74) *Attorney, Agent, or Firm* — Fox Rothschild LLP

(57) ABSTRACT

An electrokinetic actuator for a propulsion system is described. The actuator includes an array of channels, with each channel having an inlet and an outlet. A reservoir is included that contains an ionic solution of particles. A first electrode proximate to (or deposited at) the inlet and a second electrode proximate to (or deposited at) the outlet are connected to a voltage source. The voltage source and electrodes apply a voltage across the length of the channels to generate an electric field parallel to each channel. The electric field causes an electro-osmotic flow of ions from the reservoir to the outlet producing electrokinetic thrust at the outlet. By varying the concentration of the ionic solution and the magnitude of the electric field, the electro-osmotic flow of ions is controlled.

19 Claims, 11 Drawing Sheets

(56) References Cited

U.S. PATENT DOCUMENTS

| | | | | |
|---|---|---|---|---|
| 7,316,543 | B2* | 1/2008 | Goodson | F04B 19/006 204/454 |
| 2003/0209314 | A1* | 11/2003 | Guo | B01L 3/502707 156/247 |

OTHER PUBLICATIONS

Wang, "Electroosmotic pumps and their applications in microfluidic systems", 2009, Springer-Verlag, Microfluid Nanofluidics. Feb. 1, 2009.*

* cited by examiner

US 9,252,688 B2

ELECTROKINETIC NANOTHRUSTERS AND APPLICATIONS THEREOF

REFERENCE TO RELATED APPLICATIONS

This application is a non-provisional application claiming priority to U.S. Provisional Patent Application Ser. Nos. 61/699,673, filed Sep. 11, 2012, and 61/748,177, filed Jan. 2, 2012, both of which are hereby incorporated by reference as if fully disclosed herein.

STATEMENT REGARDING FEDERALLY SPONSORED RESEARCH

This invention was made with government support under Grant No. N000141110019 awarded by U.S. Department of Defense, Office of Naval Research. Accordingly, the Government has certain rights in this invention.

FIELD OF THE DISCLOSURE

The present disclosure relates to electrokenetic nanothrusters. More specifically, the disclosure relates to the use of electrokinetic nanothrusters in underwater and space propulsion.

BACKGROUND OF THE INVENTION

Electrokinetic phenomena were first observed experimentally in the nineteenth century. One of the most important and technologically promising phenomena in the field of electrokinetics is electro-osmosis, where a fluid moves through a non-conductive micro/nano-channel under an applied electric field. While traditional fluid mechanics has long held that for most cases the fluid is best modeled by a no-slip boundary condition at any surface, recent developments within the field of electrokinetics have obtained more accurate results by employing a hydrodynamic slip condition due to a surface treatment of the micro/nano-channel walls.

SUMMARY OF THE INVENTION

An electrokinetic actuator for a propulsion system is described. The actuator includes an array of channels, with each channel having an inlet and an outlet. A reservoir is included that contains an ionic solution of particles. A first electrode proximate to the inlet and a second electrode proximate to the outlet are connected to a voltage source. The voltage source and electrodes apply a voltage across the length of the channels to generate an electric field parallel to each channel. The electric field causes an electro-osmotic flow of ions from the reservoir to the outlet producing electrokinetic thrust at the outlet. By varying the concentration of the ionic solution and the magnitude of the electric field, the electro-osmotic flow of ions is controlled.

In one scenario, the electrokinetic actuator can be used to propel a space craft. This scenario exploits the advantages of the electrokinetic effect as the basis for a new class of nano-scale thrusters suitable for space propulsion. Among such advantages are their small volume, fundamental simplicity, overall low mass, and actuation efficiency. Their electrokinetic efficiency is affected by the slip length, surface charge, pH and molarity. These design variables are analyzed and optimized for the highest electrokinetic performance inside nano-channels. The optimization is done for power consumption, thrust and specific impulse resulting in high theoretical efficiency with corresponding high thrust-to-power ratios.

In another scenario, the electrokinetic actuator can be used to propel an underwater vehicle. The electro-hydro-dynamic model of the electrokinetic flow in nano-channels and represents the first attempt to exploit the advantages of the electrokinetic effect as the basis for a new class of nano-scale thrusters suitable for underwater propulsion. Among such advantages are their small volume, fundamental simplicity, overall low mass, and actuation performance. For a given working fluid, the electrokinetic performance is affected by the slip length, and surface charge. These design variables are analyzed and optimized for thrust, thrust-to-power ratio, and velocity inside nano-channels.

BRIEF DESCRIPTION OF THE DRAWINGS

Embodiments will be described with reference to the following drawing figures, in which like numerals represent like items throughout the figures, and in which.

DETAILED DESCRIPTION

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Electrokinetic phenomena are currently an active area of research in fields such as biology, electronic design, and the like and it may be well-suited for pumping liquids in micro- and nano-scale devices. Moreover, recent studies show the potential for using the electrokinetic effect as a mechanism to efficiently convert mechanical work into electrical energy. The present document bridges the gap between the established fields of micro/nano-fluidic electrokinetics and propulsion to provide the basis for a new class of micro-thrusters.

The operating principle behind the proposed electrokinetic thrusters (EKT) exploits a nano-scale electric double layer (EDL) that forms along non-conductive walls resulting in a stream of ions that can accelerate a column of a fluid when an electric potential is applied across the non-conductive channel. This document begins with an electro-hydro-dynamic analysis of the electrokinetic flow in a nano-channel which will be optimized for micro-thrusters. Next, the main electrokinetic design variables that affect the performance of the system are identified. The variables are then applied to a theoretical analysis of electrokinetic for underwater propulsion. Thrust, thrust-to-power consumption, and velocity are the key parameters. The parameters are evaluated for optimal design conditions and highest electrokinetic performance. Last, the expected performance characteristics of a designed EKT are presented.

Figures 1A, 1B, 1C:
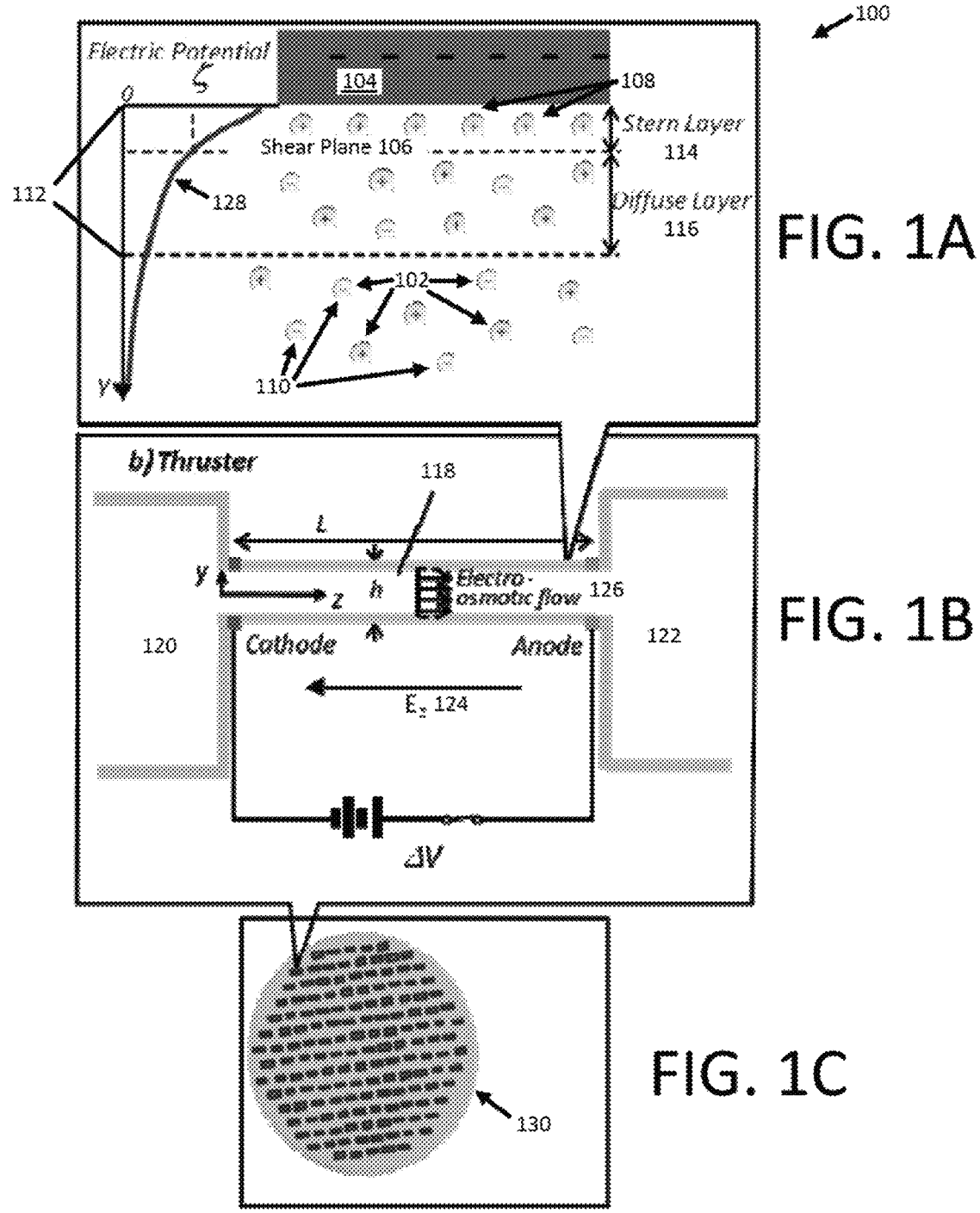
FIGS. 1A-1C are diagrams that show an example nano-electrokinetic actuator.

Nomenclature:
b=slip length
$E_z$=electric field across the channel
e=positron charge
$F_z$=electric body force
$g_1, \ldots g_5$=averaged integral functions
h=height of the square cross-sectional channel
I=total current
k=Boltzmann constant
L=length of the channel
$\dot{m}$=mass flow rate
n=unit normal vector to the wall
$n_i$=ion distribution
$n_0$=bulk ion concentration
$P_{in}$=power consumption
T=temperature
Th=thrust
V=voltage drop
v=velocity of the electroosmotic flow
$v_m$=average velocity of the electroosmotic flow
w=width of the channel
x, y, z=coordinate system
Greek Symbols
$\epsilon_o$=electric permittivity of free space
$\epsilon_r$=relative permittivity of the aqueous solution
$\eta$=viscosity of the aqueous solution
$\kappa$=inverse of the Debye length
$\mu_{EOF}$=electroosmotic flow mobility
$\mu_+$=positive ion electroosmotic mobility
$\mu_-$=negative ion electroosmotic mobility
$\mu^*$=ratio of ion mobility to the electroosmotic flow mobility
$\rho$=density of the electrolyte
$\rho_e$=net charge density inside the channel
$\sigma$=surface charge on the channel's wall
$\psi$=electric potential distribution across the channel
$\zeta$=zeta potential Referring now to FIG. 1A, an example nanothruster 100 is shown. The electrokinetic effect arises from the interface between a dilute liquid solution, represented by ions 102, and a non-conducting surface, represented by wall 104, such as the walls of a micro or nanochannel. These walls may be made of materials such as a variety of polymers or glass, for example. The physics at this interface are known to create an electrical potential at a shear plane 106 in the fluid very close to the wall 104 and a surface charge, $\sigma$, on the wall of the surface. The potential at the shear plane 106 is called the zeta potential, $\zeta$, and affects the distribution of ions within the solution as shown in FIG. 1A. The ions 102 in the solution with opposite charge to the wall 104 (the counter-ions 108) are attracted to the wall and the co-ions 110 are repelled. This produces a region near the wall known as an electric double layer (EDL) 112 with increased counter-ions 108 and reduced co-ions 110 as shown in FIG. 1A. EDL 112 includes stem layer 114 and diffuse layer 116. Stem layer is the layer of counter-ions 108 on the wall 104 where the potential of the electric field is above the $\zeta$ potential between the sheer plane 106 and the wall 104. In the diffuse layer 116, the electric potential falls from the $\zeta$ potential at the shear plane 106 to a point where the electric field no longer has any direct effect on the ions 102, 110.

Referring now to FIG. 1B, a view of the channel is expanded to include the entire channel 118 between an inlet 120 and an outlet 122. When an electrolyte solution fills a channel 118, this redistribution of ions in turn produces a transverse electric field 124, establishing an ionic charge density gradient throughout the fluid. The application of an electric field across the length of the channel 118, shown in FIG. 1B, results in an induced flow through the channel called an electro-osmotic flow 126. To characterize the proposed EKT, first the formulation of the electro-osmotic flow 126 will be described. This includes deriving the fluid velocity and the electrical current generated by the electro-osmotic flow in a nanochannel, e.g., channel 118. FIG. 1C shows an array of nanochannels 130.

The ion distribution in a channel can be modeled to describe the electro-osmotic flow. Two common assumptions are usually applied for this model. First, for the purpose of modeling the electrokinetic effects described above, the wall 104 of the channel 118 may be assumed to be a perfect electrical insulator. Second, the net lateral electrical current may be assumed to be zero. For these assumptions, equilibrium is maintained between the ionic diffusion and the conduction current within the channel 118. This allows applying a Boltzmann distribution to describe the net charge density, $\rho_e$, at any point in the fluid using Equation 1.

$$\rho_e = e(n_+ - n_-) = -2n_0 e \sinh\left(\frac{e\psi}{kT}\right) \quad \text{(Equation 1)}$$

where e is the positron charge, $n_i$, is the ion distributions, $n_0$ is the bulk ion concentration, k is the Boltzmann constant, T is the temperature, and $\psi$ is the electric potential distribution which varies across the channel. To solve for $\rho_e$ in Equation 1, the potential distribution $\psi$ is calculated (shown in FIG. 1A as potential distribution 128). Similarly the electric body force that drives the flow in the channel and generates the electro-osmotic flow is also dependent on $\psi$.

The transverse electric field 124 generated within the channel 118 induces a potential distribution 128 which can be quantified by the Poisson equation. By introducing the ionic charge density from the earlier assumptions, a Poisson-Boltzmann equation can be derived using Equation 2.

$$\frac{d^2\psi}{dy^2} = -\frac{\rho_e}{\varepsilon} \quad \text{(Equation 2)}$$

$$= \frac{\kappa^2 kT}{e}\sinh\left(\frac{e\psi}{kT}\right)$$

where $\epsilon=\epsilon_r\epsilon_0$, $\epsilon_r$ denotes the relative permittivity, $\epsilon_0$ is the electric permittivity of free space and $1/\kappa$ is the Debye length (a measure of the thickness of EDL 112) and is given by Equation 3.

$$1/\kappa = \sqrt{\frac{\varepsilon kT}{2n_0 e^2}} \qquad \text{(Equation 3)}$$

Equation 3 shows that the thickness of EDL 112 is dependent on the bulk ionic concentration of the fluid solution. Analytical solutions can be obtained for ψ from Equation 2. When EDL 112 is small compared to the size of the channel, EDL 112 does not overlap or weakly overlaps with the corresponding EDL on the opposite side of the channel 118. For those conditions, a full analytical solution for the potential can then be obtained for Equation 2 as shown by Equation 4.

$$\psi = \frac{4kT}{e}\left[\left(\text{artanh}\left(\tanh\left(\frac{e\zeta}{4kT}\right)\exp(-\kappa y)\right)\right) + \left(\text{artanh}\left(\tanh\left(\frac{e\zeta}{4kT}\right)\exp(-\kappa(h-y))\right)\right)\right] \qquad \text{(Equation 4)}$$

Here, the zeta potential, ζ, is a function of the fluid properties, including the solution's molarity and pH. Both ζ potential and σ depend not only on the solution used but also the surface properties of the channel wall and can be estimated using known methods.

In underwater applications, for example, when the electrokinetic radius is less than 2, EDL 112 overlaps, and the potential distribution 128 is given by Equation 5.

$$\psi = \psi_m + \frac{2kT}{e}\ln(cd(u/m)) \qquad \text{(Equation 5)}$$

where $\psi_m$ is the potential in the center of the channel 118 and cd(u/m) is the Jacobian elliptic function with argument u and parameter m defined by Equations 6 and 7.

$$u = \frac{\kappa y}{2\exp\left(\frac{e\psi_m}{2kT}\right)} \qquad \text{(Equation 6)}$$

$$m = \exp\left(\frac{2e\psi_m}{kT}\right) \qquad \text{(Equation 7)}$$

EDL 112 does not overlap or weakly overlaps with the EDL that forms on the opposite side of the channel 118 for high ion concentrations resulting in an almost zero potential at the center of the channel 118 and Equation 4 may be used to calculate that potential distribution. EDL 112 strongly overlaps for low ion concentrations and Equation 5 may be used to calculate that potential distribution.

Figure 2A:
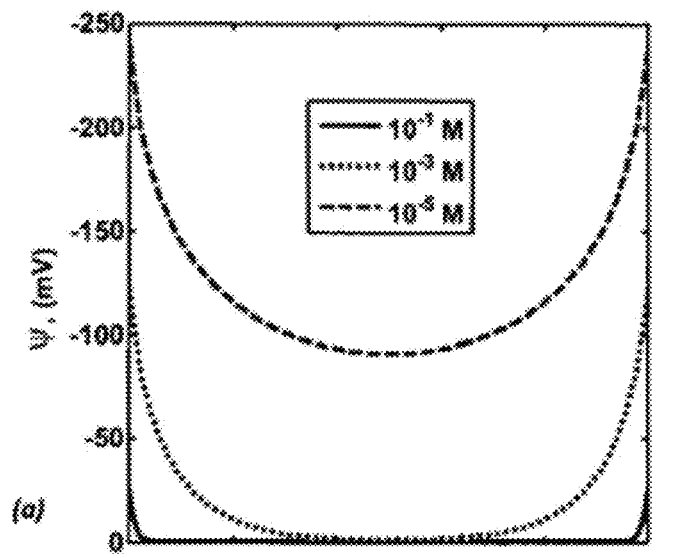
FIGS. 2A-2C are graphs showing example potential distributions.
Figure 2B:
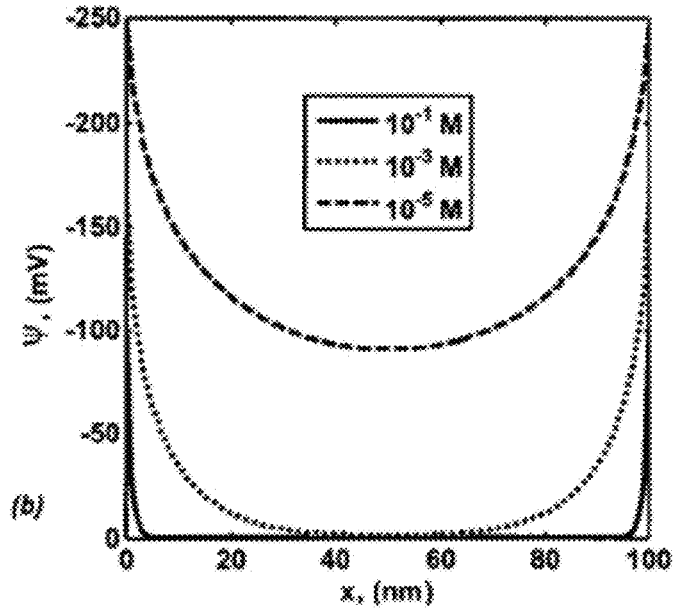

For a fixed molarity, the potential distribution may have a weak dependence on the wall surface charge (σ) and the pH of the ionic solution. If the pH of the solution is held at a constant value, a different level of surface charge may develop for each given molarity, and vice versa. For example, referring to FIGS. 2A-2C, the potential distribution ψ shown in FIG. 2A was obtained for a constant wall surface charge (σ) allowing the pH to vary, while the potential distribution ψ shown in FIG. 2B was obtained for a constant pH value allowing σ to vary. The differences between FIG. 2A and FIG. 2B are more pronounced at the walls with significant differences observed for the ζ potential. These potential distributions depict the behavior of the induced transverse electric field in a channel.

Figure 2C:
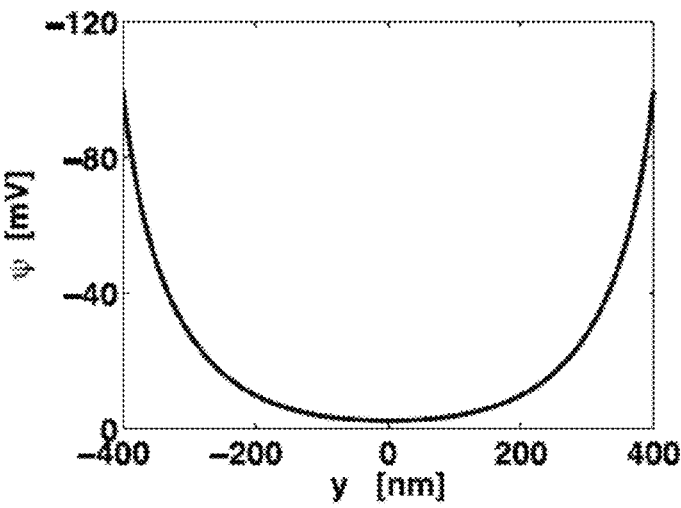

The examples provided in FIGS. 2A and 2B show the potential distribution for space applications. In the example shown in FIG. 2A, the channel is 100 nm wide and has a constant σ of −20 mC/m². As mentioned above, the pH is allowed to vary. In the example shown in FIG. 2B, the channel is 100 nm wide and the solution has a constant pH of 9. For underwater applications, as shown in FIG. 2C, potential distribution is calculated for an 800 nm wide channel with a constant σ of −100 mC/m².

The electric body force in electro-osmotic flows drives the flow in the channels and it is just a Coulombic force given by $$F_z = E_z \rho_e \qquad \text{(Equation 8)}$$
$$= -E_z \varepsilon \frac{d^2\psi}{dy^2},$$

where the charge density $\rho_e$ has been be written in terms of the potential distribution from Equation 2. The electro-osmotic induced fluid flow may be described by the Navier-Stokes equation. For no external pressure applied, the equation simplifies to a balance between viscous forces and Coulombic forces given by as $$\eta\frac{d^2 v}{dy^2} - E_z\varepsilon\frac{d^2\psi}{dy^2} = 0 \qquad \text{(Equation 9)}$$

where v(y) is the fluid velocity along the channel. To solve Equation 9, two boundary conditions may be utilized. The first condition is that the velocity has a finite value at the center of the channel, and the second condition refers to the velocity at the wall, which has a value given by the Navier condition, $v(\pm h/2) = -(\varepsilon b E_z/\eta)(d\psi/dy)|_{y=\pm h/2}$. The resulting velocity profile is, $$v(y) = -\frac{\varepsilon\zeta}{\eta}\left[\left(1-\frac{\psi}{\zeta}\right) - \frac{b}{\zeta}\left(\frac{-\sigma}{\varepsilon}\right)\right]E_z \qquad \text{(Equation 10)}$$

where the first term on the right-hand side of the equation is called the electro-osmotic mobility ($\mu_{EGF} = \varepsilon\zeta/\eta$). The velocity equation shows that the two physical effects driving the flow are the transversal electric field and the slip velocity at the channel wall.

Figure 3A:
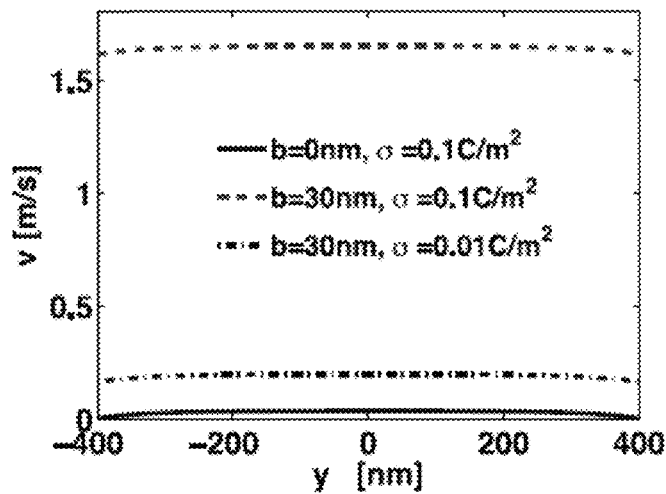
FIG. 3A-3B are graphs showing example velocity profiles.

In an example of an underwater application, a 800 nm channel, different pH values may significantly affect the surface charge. Flow may be considered one dimensional for simplicity. In an example shown in FIG. 3A the velocity profile of the channel is shown under a condition of no slip (b=0 nm) and moderate slip (b=30 nm). Both the pH increase and the moderate slip significantly enhance the maximum velocity that can be obtained in the channel. The velocity profiles have constant values along most of the channel. This value corresponds to the product of the electro-osmotic mobility by the electric field. The slight decay of the velocity near the wall shows a very weak EDL overlap. In space applications, in an example shown in FIG. 3B, the pH of the solution is held constant, which results in increasing values of the surface charge for increasing values of the molarity and in an increase in velocity.

According to the previous analysis, it can be seen that the surface charge and the slip length will be two of the electrokinetic design parameters that can be used to control the velocity. The first depends on the solution properties (molarity and pH) and the second depends on the material of the channel and its surface treatment. The electric field may be the third variable that can be used to regulate the velocity since the velocity increases with $E_z$, as shown in Equation 10. This is a control variable of the system, which can be regulated by the voltage applied across the channel.

The average electro-osmotic flow velocity $v_m$ can be obtained by integrating the velocity profile in Equation 10 over the entire channel to yield $$v_m = -\frac{\varepsilon E_z \zeta}{\eta}\left(g_1 - \frac{b}{\zeta}\left(\frac{-\sigma}{\varepsilon}\right)\right) \quad \text{(Equation 11)}$$

where $g_1$ is the integral given by $$g_1 = \frac{1}{h}\int\left(1 - \frac{\psi}{\zeta}\right)dy \quad \text{(Equation 12)}$$

This expression of the velocity will be used in the propulsive analysis to determine the thrust, and power input of the EKT. But first, an expression for the electrical current that runs through the channels needs to be derived so that the EKT power consumption can be calculated.

The transport of ions under the applied electric field that generates the electro-osmotic flow describes the current flux in the channel. This current is composed of two terms, one is the conduction current ($j_{cond}$), and the other is due to the convection of ions ($j_{conv}$). The individual contribution of each current density term needs to be considered before the total current, and power consumption is derived for the electrokinetic thrusters. The current density due to charge transport is based on the movement of the net charge density through the channel by the bulk fluid velocity $j_{conv} = \rho_e v$. Using the expressions for net charge density from Equation 1 and velocity from Equation 10, the current density due to convection can be expressed as a function of the electrokinetic variables as follows, $$j_{conv} = 2en_0\sinh\left(\frac{e\psi}{kT}\right)\frac{\varepsilon E_z \zeta}{\eta}\left(\left(1 - \frac{\psi}{\zeta}\right) - \frac{b}{\zeta}\left(\frac{-\sigma}{\varepsilon}\right)\right) \quad \text{(Equation 13)}$$

The current density due to conduction $j_{cond}$ can be derived from Ohm's law and is based on the movement of the ions relative to the bulk fluid. This is the current that would be seen if there was no velocity field in the channel. For simplicity an equimobile electrolyte ($\mu_+ = -\mu_- = \mu$) can be used with a Boltzmannm ion distribution to give $$j_{cond} = \mu e(n_+ + n_-)E_z = 2\mu e n_0 \cosh\left(\frac{e\psi}{kT}\right)E_z \quad \text{(Equation 14)}$$

The two current terms may be compared using the same electrokinetic variables ($\sigma$, $b$) that may be used to study the performance of EK thrusters. The first observation from such a comparison is that $j_{cond}$ increases as molarity increases. However, as molarity increases, $j_{conv}$ decreases in the midsection of the channel and increases near walls. It is also observed that only for the lowest molarity ($10^{-5}$ M) is $j_{conv}$ larger than $j_{cond}$. Also observed is that that $j_{conv}$ increases as $\sigma$ (surface charge) increases. Last, the introduction of a slip length results in an increase in $j_{conv}$ although this increase is more than compensated by the increase in efficiency and performance as will be discussed.

To understand which of the two terms, $j_{conv}$ or $j_{cond}$, dominate, the ratio of $j_{conv}/j_{cond}$ may be calculated. In an example, the conduction current may be larger than the convection current for all the cases without slip. On the other hand, when a non-zero slip length is present (e.g., b=30 nm), the convection component may be larger except for the smallest $\sigma$. The reason is that the slip length significantly contributes to the velocity increase (as described in Equation 10) and this is directly proportional to the $j_{conv}$. In the other hand, the slip length does not affect the $j_{cond}$ term.

The total current density j can be obtained by adding $j_{cond}$ and $j_{conv}$ to give $$j = 2n_0 e \sinh\left(\frac{e\psi}{kT}\right)\left(\frac{\varepsilon E_z \zeta}{\eta}\right)\left[\left(1 - \frac{\psi}{\zeta}\right) + \frac{b}{\zeta}\left(\frac{-\sigma}{\varepsilon}\right)\right] + \quad \text{(Equation 15)}$$

$$2\mu e n_0 \cosh\left(\frac{e\psi}{kT}\right)E_z$$

The total current (I), which may be used to calculate the power consumption, can be obtained by integrating the total current density over the area of the nanochannel to give $$I = ew\int_{-h/2}^{h/2} j\,dy = ewh\left[2n_0\left(\frac{\varepsilon\zeta}{\eta}\right)\left(g_2\mu^* + g_3 - \frac{b}{\zeta}g_4\left(\frac{-\sigma}{\varepsilon}\right)\right)E_z\right], \quad \text{(Equation 16)}$$

where $\mu^*$ is the ratio of ion mobility $\mu$ to the electro-osmotic flow mobility $\mu_{EOF}$. The terms $g_2$, $g_3$, and $g_4$ are introduced to simplify the expression and correspond to the average values obtained after integrating the following expressions, $$g_2 = \frac{1}{h}\int_h \cosh\left(\frac{e\psi}{kT}\right)dh \quad \text{(Equation 17)}$$

$$g_3 = \frac{1}{h}\int_h \sinh\left(\frac{e\psi}{kT}\right)\left(1 - \frac{\psi}{\zeta}\right)dh \quad \text{(Equation 18)}$$

$$g_4 = \frac{1}{h}\int_h \sinh\left(\frac{e\psi}{kT}\right)dh \quad \text{(Equation 19)}$$

The electro-hydro-dynamic analysis performed has laid the foundations to study the electrokinetic flow in a nanochannel, and can be used to calculate the expected performance of an ek thruster (ekT) as a single emitter in a space propulsion array system. Thrust, power consumption, specific impulse and efficiency are the key propulsive variables to analyze the capabilities of the ekT. The dependence of these variables with the main electrokinetic parameters will be discussed next.

All the calculations are computed using the rectangular emitter sketched in FIG. 1B, with L=1 μm and w=h=100 nm. The applied electric field is $5\times10^8$ V/m which corresponds to a voltage drop between the electrodes of 500 V. Electric field values as high as $5\times10^8$ to $7\times10^8$ V/m have been used in molecular dynamic simulations of electro-osmotic flows for water solutions, although lower electric breakdown values for water have also been reported. The applied $\Delta V$ may be reached by the propulsion power units (PPU) used in current space thrusters.

For the purposes of space propulsion, large velocity values are important. From the electro-hydro-dynamic analysis above, it is shown that increases in surface charge density, applied electric field, and slip at the channel wall all may result in increases in velocity. These increases may have a significant effect on the level of electric current and therefore the level of power consumption. Under certain conditions, however, this increase in power consumption is justified by proportionately larger increases in velocity. All the calculations are computed using the rectangular emitter sketched in FIG. 1B, with L=1 μm and w=h=100 nm. In one scenario, the applied electric field may be on the order of $10^8$ V/m, e.g., $5 \times 10^8$ V/m which corresponds to a voltage drop between the electrodes of 500 V. Electric field values as high as $5\text{-}7 \times 10^8$ V/m have been used in molecular dynamic simulations of electro-osmotic flows for water solutions, although lower electric breakdown values for water have also been reported. The proposed applied $\Delta V$ may be reached by the propulsion power units (PPU) used in current space thrusters.

For purposes of underwater propulsion, increases in velocity can be obtained from increases in surface charge density, applied electric field, and slip in the channel wall. The previous electro-hydro-dynamic analysis is used to model the performance of an electrokinetic actuator as a thruster. This includes evaluating its thrust and thrust to power capabilities. All the analytical calculations are obtained for the rectangular thruster sketched in FIG. 1B, with L=1 μm and w=h=800 nm. In a scenario, the applied electric field may be on the order of $10^5$ V/m, e.g., $5 \times 10^5$ V/m which corresponds to a voltage drop between the electrodes of 0.5 V. Electric field values as high as 5 to $7 \times 10^8$ V/m have been used in molecular dynamic simulations of electro-osmotic flows for water solutions, although lower electric breakdown values for water have also been reported. There is nevertheless the possibility that electrochemical reactions may occur, although this is more common for large micro-actuators than for the nano-thrusters proposed. There are multiple methods suggested for reducing or canceling these reactions such as separating the electrodes from the electrokinetic actuator by an ion exchange membrane or gels or operating at some offset high frequency instead of pure DC mode.

Thrust may be achieved by the electro-osmotic effect in the nano-channel by transforming the input electrical power to total kinetic power. During typical operation the thrust levels may be controlled by the applied voltage. This thrust is proportional to the exhaust velocity and mass flow rate of the fluid. $Th = \dot{m} v_m$. Writing the mass flow rate $\dot{m} = \rho v_m h w$ in terms of the electrokinetic variables yields $$\dot{m} = -\rho w h \frac{\varepsilon E_z \zeta}{\eta} \left( g_1 - \frac{b}{\zeta}\left(\frac{-\sigma}{\varepsilon}\right) \right). \quad \text{(Equation 20)}$$

Substituting Equations 20 and 11 into the thrust equation gives the thrust developed as a function of the electrokinetic design parameters $$Th = \rho w h \left(\frac{\varepsilon E_z \zeta}{\eta}\right)^2 \left( g_1 - \frac{b}{\zeta}\left(\frac{-\sigma}{\varepsilon}\right) \right)^2. \quad \text{(Equation 21)}$$

Figure 4A:
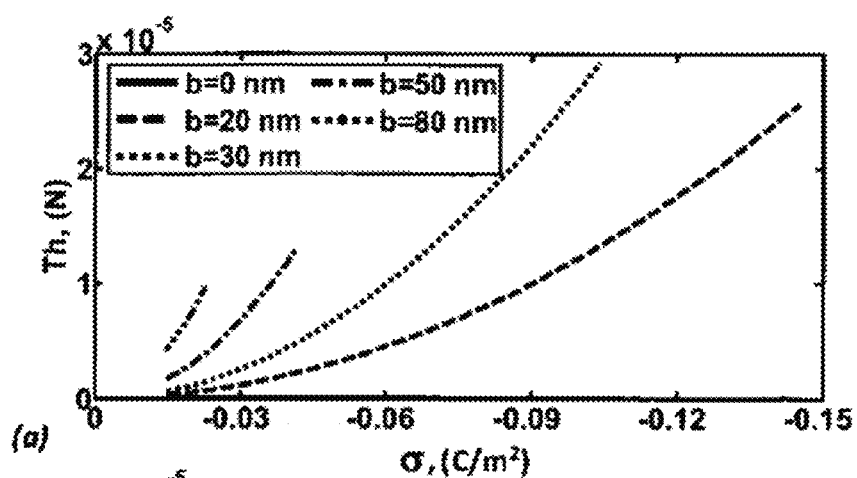
FIG. 4A-4C are graphs showing example thrust results.
Figure 4B:
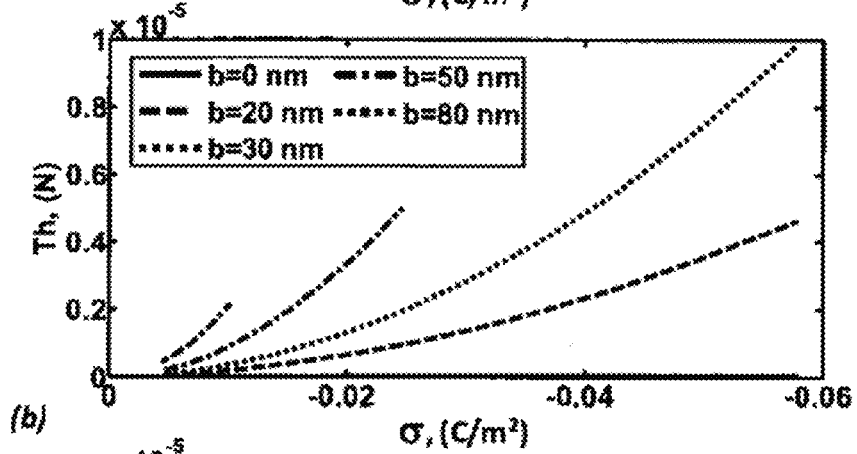
Figure 4C:
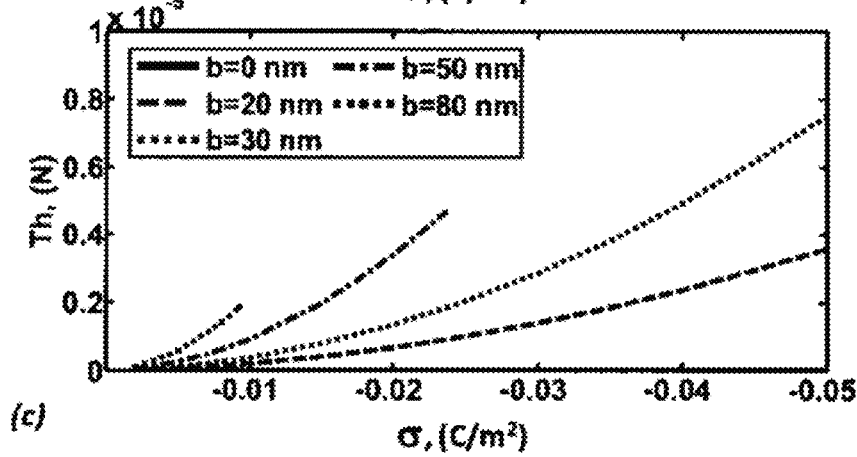

For space applications, Equation 21 is plotted in FIGS. 4A-4C, showing the variation of thrust with surface charge density σ for several values of slip length b and molarity M.

For all three molarities studied, the thrust increased with σ. For present conditions, the results indicate that a single emitter may generate thrust as high as 30 μN. In the other hand, when the no-slip condition is used, the results indicated smaller thrust values (0.01 to 0.1 μN) because the average velocity of the flow decreases by an order of magnitude if there is no slip. Considering the small size of each emitter, and that they can be grouped in large arrays as shown in FIG. 1C, arrays with thousands of emitters working at low thrust levels can be designed for high-precision space propulsion systems. A comparison between FIGS. 4A, 4B, and 4C shows that changes in molarity from $10^{-1}$ to $10^{-5}$ M reduces thrust levels from 30 μN to 1 μN. This suggests that lower and more precise thrust levels (and lower power consumption) can be obtained by simply adjusting the molarity of the solution.

FIGS. 4A-4C also show that the slip condition has a significant effect on the thrust value s and that for a fixed b the thrust increases with σ. In fact, for any given combination of molarity M and σ, an optimal slip length b can be found such that thrust is maximized. In the other hand, slip lengths greater than 30 nm may be incompatible with a wide range of σ. At present, these effects are not well known, but some studies have concluded that they are related to a competition between the efficiency gains from advecting more counter-ions in the double layer as σ increases and the increased resistive dissipation caused by the additional counter-ions. Taking this into consideration, a b=30 nm may be used as the reference to obtain the maximum ekT emitter performance values from FIGS. 4A-C as follows: FIG. 4A, Th=30 μN for M=10-1 mol/L and 0=−0.105 C/m2; FIG. 4B, Th=10 μN for M=10-3 mol/L and 0=−0.058 C/m2; and FIG. 4C, Th=7.4 μN for M=10-5 mol/L and σ=−0.05 C/m2.

Figure 5:
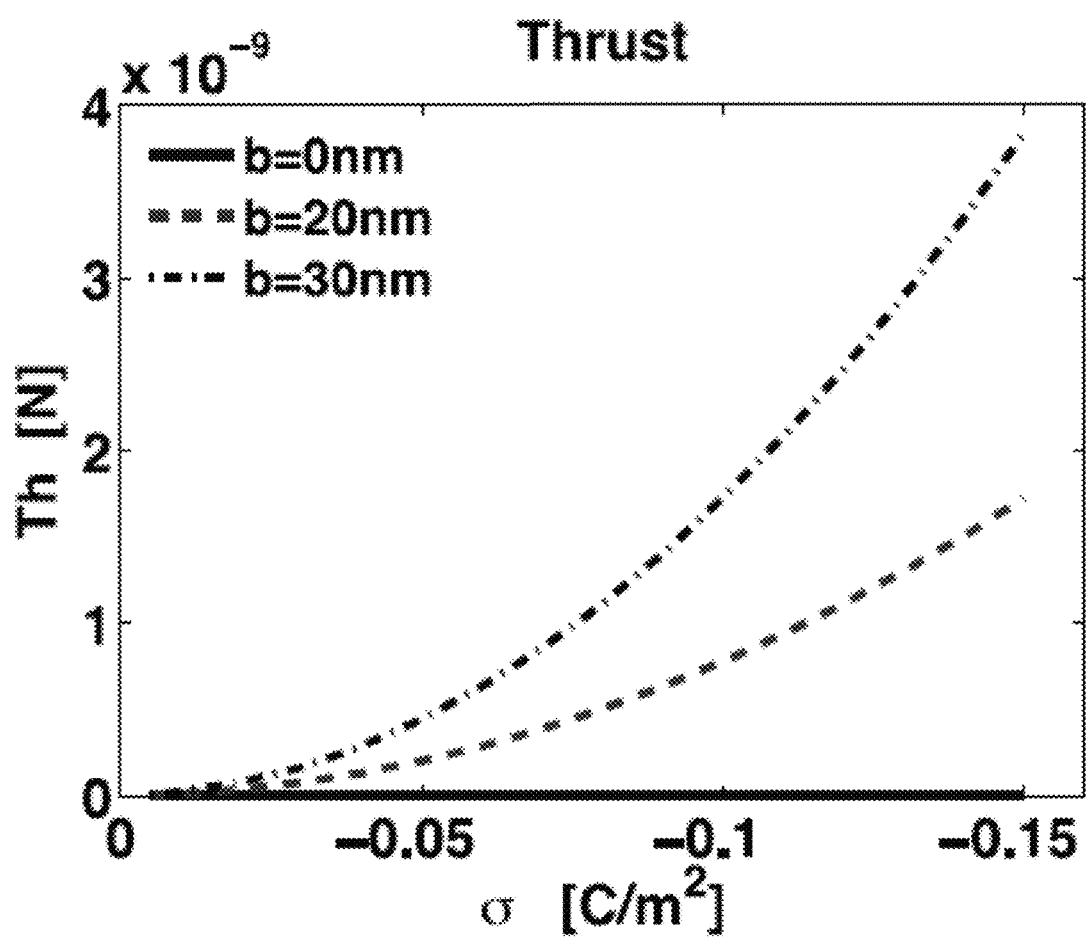
FIG. 5 is a graph showing an example thrust result.

For underwater applications, Equation 21 is plotted in FIG. 5, showing the variation of thrust with surface charge density σ for several values of slip length b. In general, the thrust increased significantly with σ. This results in thrust as high as 1.7 nN for the modeled single nano-thruster. Considering the nano-scale size of each thruster, an array could be designed with thousands of thrusters working at low thrust levels for higher thrust generation.

FIG. 5 also shows that increasing the slip length results in a significant increase on the thrust values and that for a fixed slip length b the thrust increases with σ. It should be noted that slip lengths greater than 30 nm are incompatible with a wide range of σ. These effects may be related to a competition between the efficiency gains from advecting more counter-ions in the double layer as σ increases and the increased resistive dissipation caused by the additional counter-ions. Taking the incompatibility of slip lengths larger than 30 nm, as discussed above, into consideration, a maximum value of b=30 nm may be used as the reference to obtain the electrokinetic thruster performance values from FIG. 5 as follows: Th=1.7 nN for a molarity of $10^{-5}$ M and σ=−0.1 C/m². These values also produce an exit velocity of 1.64 m/s.

To characterize the performance of the ekT, the highest specific impulse $I_{sp}$ that they can attain is now discussed. The specific impulse is given by $I_{sp} = v_m/g$. Considering the high average velocities $v_m$ observed in FIGS. 3A and 3B from Equation 11, it is possible to estimate values for $I_{sp}$ in the hundreds of seconds. The combination of the results obtained for Th and $I_{sp}$ suggest that ekT arrays would be ideal candidates for missions requiring high precision thrust at relatively low specific impulses. A more detailed analysis of thrust and specific impulse combinations is discussed below.

Power consumption during the operation of a single emitter can be obtained by multiplying the total current by the applied voltage $P_{in}=I\Delta V$. By substituting the expression for the total current from Equation 16. $P_{in}$ can be written in terms of electrokinetic variables, $$P_{in} = 2n_0 wheE_z \left(\frac{\varepsilon\zeta}{\eta}\right)\left(g_2\mu^* + g_3 - g_4\frac{b}{\zeta}\left(\frac{-\sigma}{\varepsilon}\right)\right)\Delta V \quad \text{(Equation 22)}$$

Figure 6A:
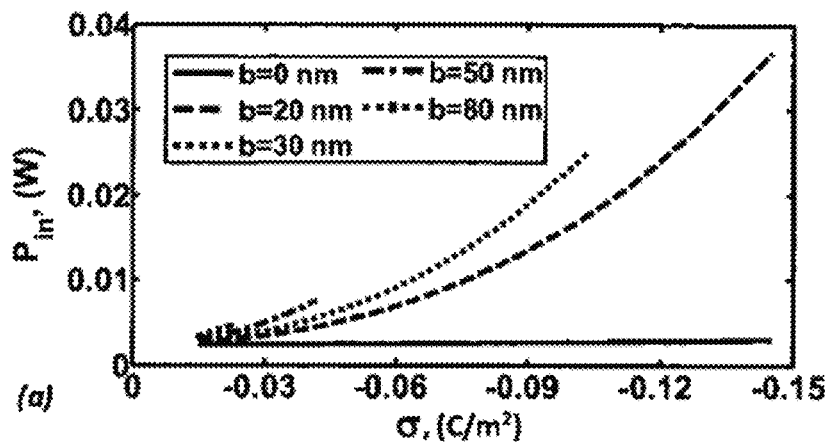
FIGS. 6A-6C are graphs showing example input power results.
Figure 6B:
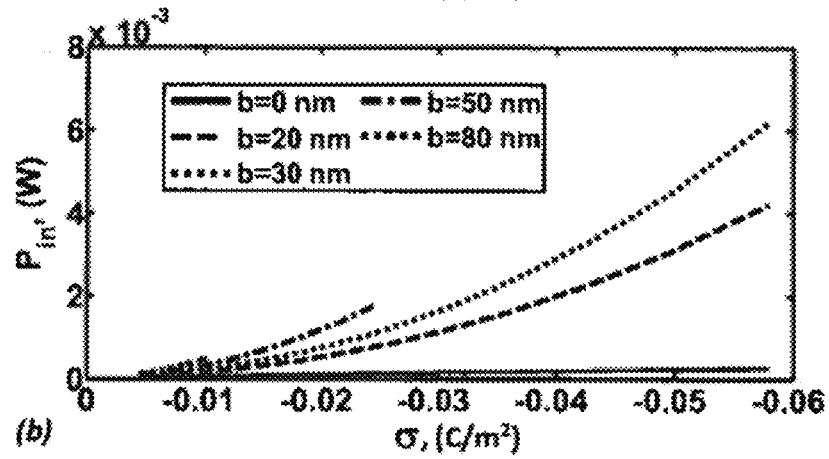
Figure 6C:
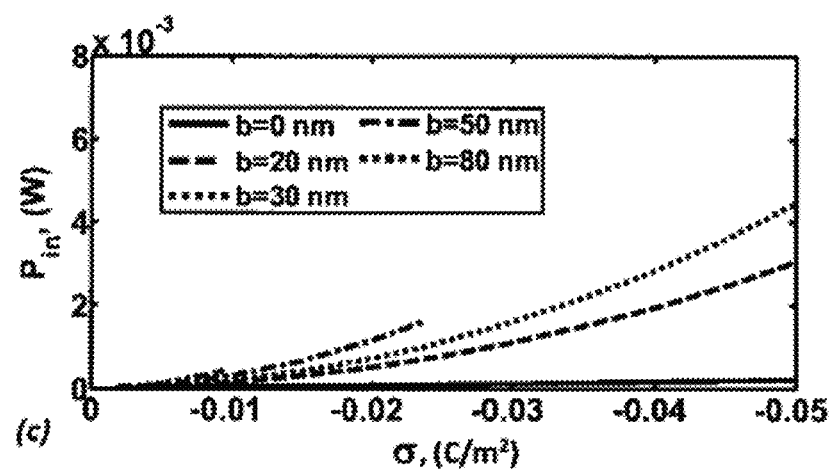

The power consumption for space applications is plotted in FIGS. 6A-6C showing how it varies with surface charge density σ for several values of slip length b and molarity M. For all three molarities considered in FIGS. 6A-6C, $P_{in}$ increased with σ and with b. FIGS. 6A-6C also shows that the slip condition has a significant effect on $P_{in}$ and that for a fixed b the power consumption grows significantly with σ. Also, high slip length conditions (b>30 mm) were only possible with a small range of σ. Overall the trends observed for $P_{in}$ are very similar to those observed for Th in FIGS. 4A-4C and 5. A brief comparison between the thrust and power consumption curves corresponding to slip lengths of 20 nm and 30 nm, shows that increasing b from 20 to 30 nm has a favorable effect on the ekT, because the thrust increases faster than the power consumption, thus resulting on a more efficient thruster. Last, FIGS. 6A-6C shows that a single emitter consumes between 1 to 10 mW, depending on the design parameters. This level of power consumption is a significant reduction from that required by an equivalent single emitter based on colloidal thruster technology.

Figure 3B:
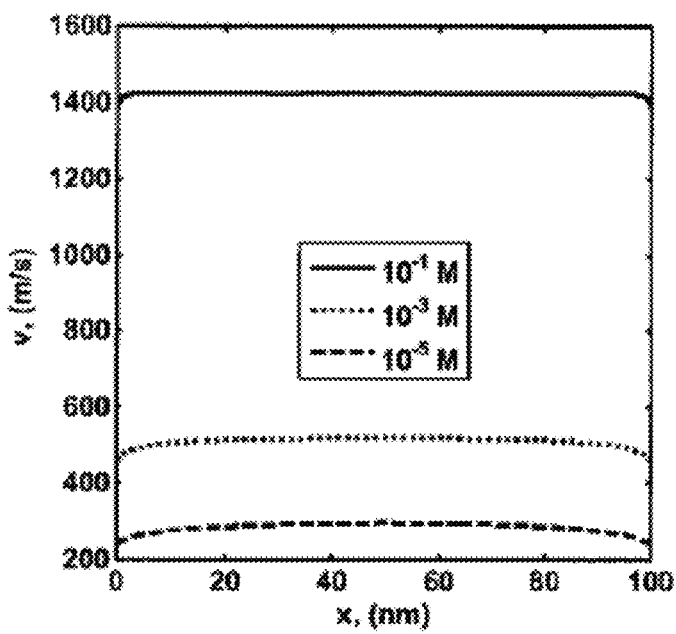

As discussed earlier, the degree of overlap is given by the electrokinetic radius (Kh/2) It is observed that $P_{in}$ increases monotonically with the electrokinetic radius. This indicates that the power consumption increases as the molarity increases since the molarity has the strongest effect on the overlap of the EDL for fix channel dimensions as shown in FIG. 3B. This shows that when the EDL overlaps the power consumption is the lowest, and for a fixed electrokinetic radius $P_{in}$ increases with increasing slip.

An important consideration for space propulsion systems is high efficiency. Thruster efficiency is defined as the ratio of the thruster power output to the electrical power input. As it will be shown, one of the main strengths of ekTs for space applications is their high efficiency which should result in high thrust- to-power-in ratios. To fully characterize this efficiency of ekTs, the role that the slip length and the solution properties play on the optimization of ekT performances may be considered through a parametric study. The electrokinetic efficiency is defined as the ratio of the ekT power output to the electrokinetic power input, and it is obtained from the classical expression for efficiency, $$\chi_{ek} = \frac{P_{out}}{P_{in}} = \frac{\frac{1}{2}\dot{m}v_m^2}{I\Delta V} = \frac{\frac{1}{2}\rho wh\left(-\frac{\varepsilon E_z\xi}{\eta}\left(g_1 - \frac{b}{\zeta}\left(\frac{-\sigma}{\varepsilon}\right)\right)\right)^3}{2n_0 wheE_z\left(\frac{\varepsilon\zeta}{\eta}\right)\left(g_2\mu^* + g_3 - \frac{b}{\zeta}g_4\left(\frac{-\sigma}{\varepsilon}\right)\right)\Delta V} \quad \text{(Equation 23)}$$

The ekT power output is the kinetic energy per unit time and both $v_m$ and $\dot{m}$ are written in terms of the electrokinetic variables defined previously in Equations 11 and 20. Similarly the power input is written in terms of the electrokinetic variables using Equation 16. Thus, the efficiency obtained in Equation 22 can be simplified to give $$\chi_{ek} = \frac{\rho}{4}\frac{\left(\frac{\varepsilon\zeta}{\eta}\right)^2}{en_0}\left[\frac{\left(g_1 - \frac{b}{\zeta}\left(\frac{-\sigma}{\varepsilon}\right)\right)^3}{g_2\mu^* + \left(g_3 - g_4\frac{b}{\zeta}\left(\frac{-\sigma}{\varepsilon}\right)\right)}\right]\frac{E_z}{L} \quad \text{(Equation 25)}$$

where the efficiency is expressed as a function of the main electrokinetic parameters. Defined in this way, the efficiency is only related to the electrokinetic process in the micro/nano-channel and it does not take into account PPU consumption and other inefficiencies. However, these factors may be similar to those of existing EP systems which estimate internal thruster efficiency, which may be estimated by multiplying by $\chi_{loss}$=0.95.

Figure 7A:
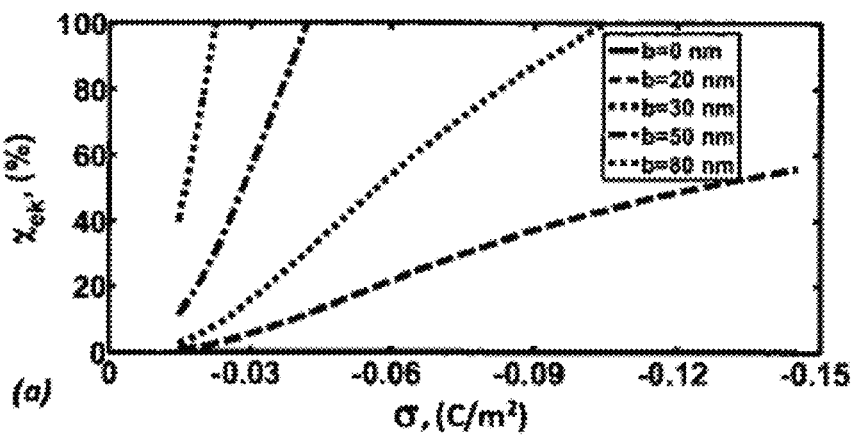
FIGS. 7A-7C are graphs showing example thruster efficiencies.
Figure 7B:
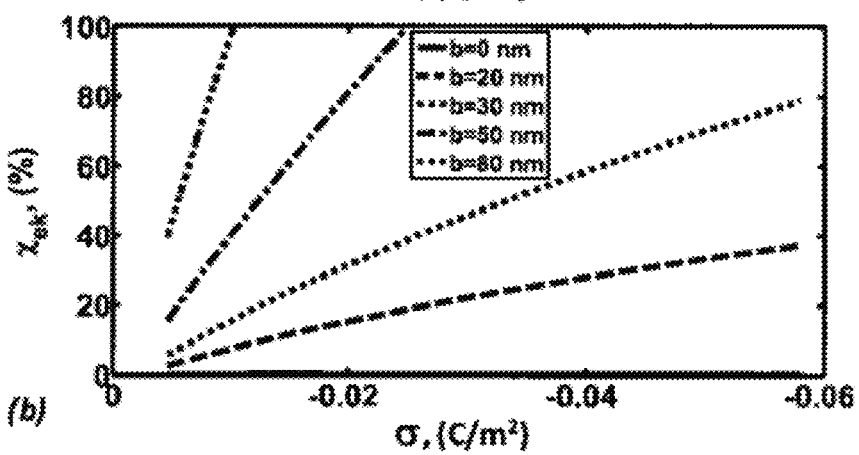
Figure 7C:
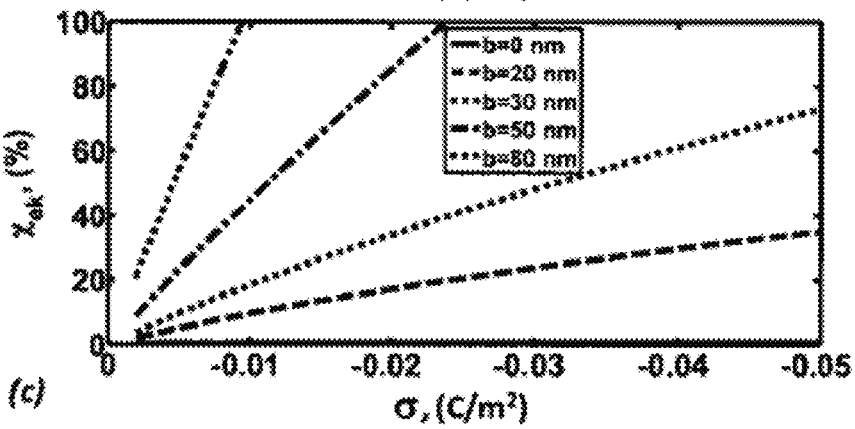

The efficiency is plotted in FIGS. 7A-7C for three different molarities using the proposed electrokinetic model from Equation 25. The plots show the efficiency variation with surface charge density σ, taking into account five different slip lengths b. For all three molarities considered in FIGS. 7A-7C, $X_{ek}$ increased with σ and with b. For instance, FIG. 7A ($10^{-1}$ M) shows that if b~30 nm or higher, the efficiency reaches 99%. Such high values exceed those achieved by major state-of-the-art propulsion systems, proving the large potential of electrokinetic thrusters as a space propulsion system when high efficiency is a main requirement. The high slope of the curves in FIGS. 7A-7C shows that the electrokinetic efficiency is very sensitive to o variations, especially for high values of b. This implies great precision needed when adjusting the electrokinetic parameters to obtain the highest efficiency for a given ekT design. The plots in FIGS. 7A-7C also show that when the molarity decreases higher slip lengths are needed to maintain the efficiency. In practice, efficiencies over 99% can be obtained for more moderate slip lengths (20-40 nm) for the modeled 100 nm EKT emitter used for the calculations in FIGS. 7A to 7C.

A key parameter in the design of EKT is the thrust-to-power ratio. This ratio, together with the system's mass and power requirements, may strongly impact a space or underwater mission's characteristics such as duration of thrust, system cost and payload capability. A thrust-to-power ratio relation is obtained from Equations 21 and 22 as follows.

$$\frac{Th}{P_{in}} = \frac{\rho}{2}\frac{\left(\frac{\varepsilon\zeta}{\eta}\right)}{en_0}\left[\frac{\left(g_1 - \frac{b}{\zeta}\left(\frac{-\sigma}{\varepsilon}\right)\right)^2}{g_2\mu^* + \left(g_3 - g_4\frac{b}{\zeta}\left(\frac{-\sigma}{\varepsilon}\right)\right)}\right]\frac{1}{L}. \quad \text{(Equation 26)}$$

Thrust-to-power ratios are plotted for a number of scenarios shown in FIGS. 8A-8D.

Figure 8A:
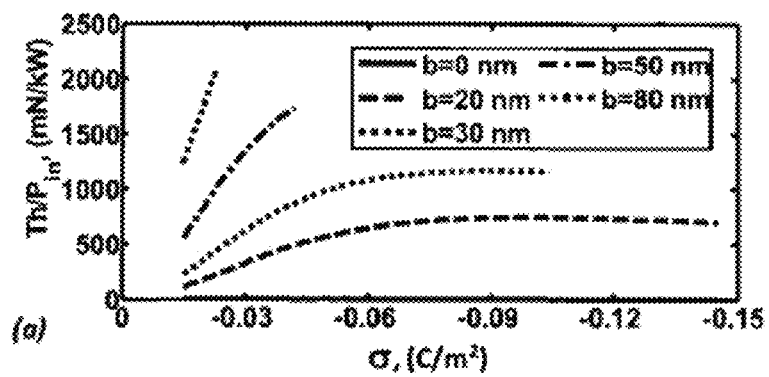
FIGS. 8A-8D are graphs showing example thrust-to-power ratios.
Figure 8B:
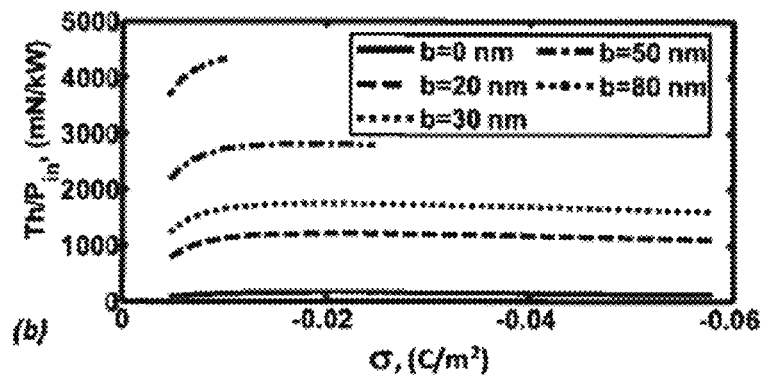
Figure 8C:
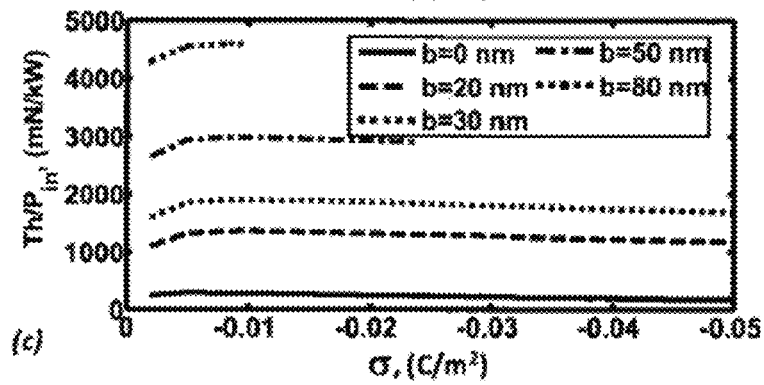

For space applications, the effect of the electrokinetic variables M and σ, and the slip length on the thrust-to-power ratio is shown in FIGS. 8A-8C. The plots reveal that high values of b and low molarities may achieve high thrust-to-power ratios. It also is observed that the variation of the slip length and the molarity may affect the thrust-to-power ratio in a similar way as they affected the electrokinetic efficiency, as shown in FIGS. 7A-7C. Earlier observations (FIGS. 4A-4C and 6A-6C) indicated that both the thrust and the power consumption always increased with σ. FIGS. 8A-8C now show that for low σ values (that strongly depend on the molarity) the thrust increases at a higher rate than the power consumption with increasing σ. Then, the thrust-to-power ratio reaches a maximum (except for b=50 nm and b=80 nm at the highest molarity $10^{-1}$ M) for what is considered the optimal σ values. The trend observed is then reverted and as σ continues increasing the power consumption increases at a slightly higher rate than the thrust. This behavior is justified by the effect that the size of the EDL has on the velocity and power consumption.

total actuator occupied area of about 190 cm². Other possibilities include increasing the exit velocity of the actuator which may increase the power consumption but may allow larger generations of thrust with a smaller actuator occupied area.

TABLE 1

Performance characteristics for a single electrokinetic thruster design.

| | Single EK Thruster | | | | | | | EK Thruster Array | | | |
|---|---|---|---|---|---|---|---|---|---|---|---|
| | Dimensions | | EK Design Variables | | | Performance | | Performance | | | |
| | w (nm) | h (nm) | σ (C/m²) | Molarity (mol/L) | Slip b (nm) | Th (nN) | $P_{in}$ (nW) | Thrusters Qty | V (m/s) | Th (N) | Area (cm²) |
| $EKT_1$ | 800 | 800 | −0.1 | 1.0E−05 | 30 | 1.7 | 1.7 | $2.9 \times 10^9$ | 1.64 | 5 | 19 |

Figure 8D:
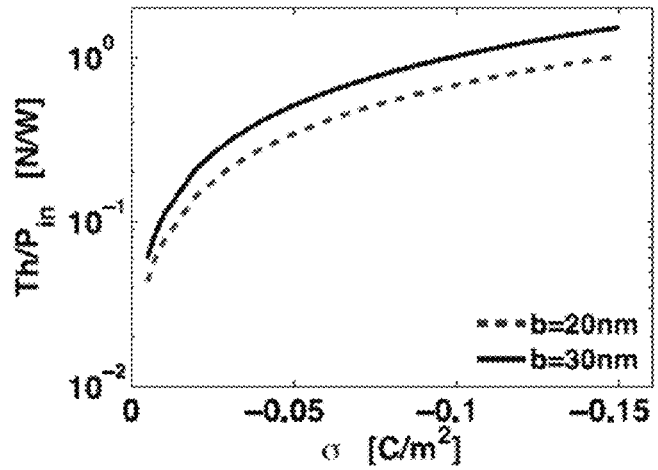

In underwater applications, thrust-to-power ratio can similarly impact the type of missions the UUV can perform in terms of endurance and the maximum velocity that can be achieved. The effect of the electrokinetic variables σ and the slip length b on the thrust-to-power ratio in an underwater environment is shown in FIG. 8D. The figure reveals that for each b value, there is surface charge value that maximizes the thrust-to-power ratios. FIG. 8D also shows that for low σ values the thrust increases at a higher rate than the power consumption with increasing σ.

The previous results show the importance of electrokinetic parameters such as surface charge density and slip length, for optimum design conditions for specific propulsion missions. Although it is not always possible to directly vary these parameters during mission operation they can be chosen during the design and fabrication of the ekTs. This can be achieved by optimal selection of actuator fabrication material, actuator dimensions and electrolyte solution in order to get σ and b for maximum electrokinetic efficiency. The total potential drop, ΔV, can be varied during mission operation, which allows direct control of the electrokinetic thrust. If more thrust or higher thrust control is required than the one provided by a single thruster, an array with large number of thrusters can be constructed. This would allow varying thrust levels incrementally by simply varying the number of thrusters in use at any one time.

The thrust capabilities of an underwater single rectangular thruster, for example, a thruster similar to that in FIG. 1B, with L=1 μm and w=h=800 nm. In this scenario, both the thrust and the velocity increase by simply increasing the potential drop from 0.3 V to 0.5 V. The electrokinetic parameters that provide maximum performance in this scenario are: molarity of $10^{-5}$ M with b=30 nm and σ=−100 mC/m². In terms of performance, the designed single EKT can deliver a thrust of 1.7 nN and peak exit velocity of 1.5 m/s under ideal conditions.

Knowing the performance of a single actuator, the performance of a large array of actuators can be predicted because the scaling is linear. Full details for an example underwater ekT are shown in Table 1. The results show than an array of $2.9 \times 10^9$ thrusters occupying an area of 63 cm², where 19 cm² corresponds to the open area of the actuators and the rest corresponds to the spacing between the actuators, can generate 5N under a 0.5V applied voltage. The thrust to power ratio is approximately 1.04 N/W for this configuration which would result in a power consumption of about 5 Watts. For larger thrust generation, a larger array would need to be used. For instance, if 50N of thrust are needed, the array may need to contain 10 times the number of actuators, resulting in a The electrokinetic principle can provide the basis for a new class of underwater propulsion thrusters. The thrust is achieved by the electro-osmotic effect in nano-channels by transforming input electrical power to total kinetic power. Specific performance characteristics for EK thrusters can be determined from fundamental scaling laws for electrokinetic flows. This involved an electro-hydro-dynamic analysis based on the study of the electrokinetic flow in a nano-channel. The main electrokinetic parameters that may affect the performance of the system are related to surface properties of the nano-channel and the ionic liquid solution. These electrokinetic design variables included the slip length, and the surface charge. These variables were analyzed (for a fixed nano-channel length and width) to show, among other things, that designing ekTs with increased surface charge density, and slip length may result in increases in velocity. These increases may have a significant effect on the level of electric current and therefore the level of power consumption; however they may be justified by significant increases in velocity.

The electrokinetic design variables are applied to the electrokinetic propulsion analysis. Thrust, power consumption, thrust-to-power ratio and optimized velocity are the key parameters considered in the analysis. One of the main strengths of the proposed electrokinetic thrusters for underwater propulsion is the high thrust-to-power ratio. Theoretical analysis showed that the ek performance increased with b and there was an optimal σ.

Figure 9:
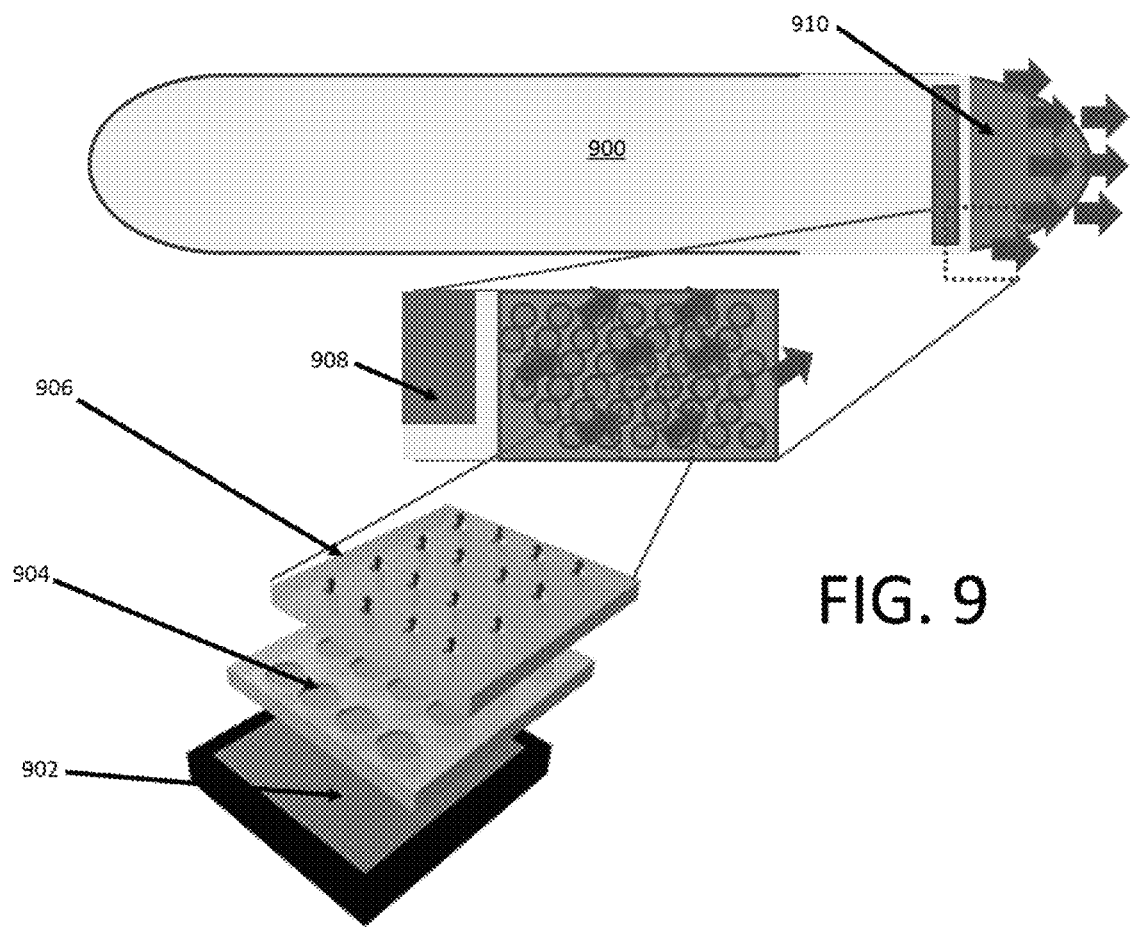
FIG. 9 is a diagram showing a electrokinetic nanothruster as a primary propulsion system on an underwater vehicle.
Figure 10:
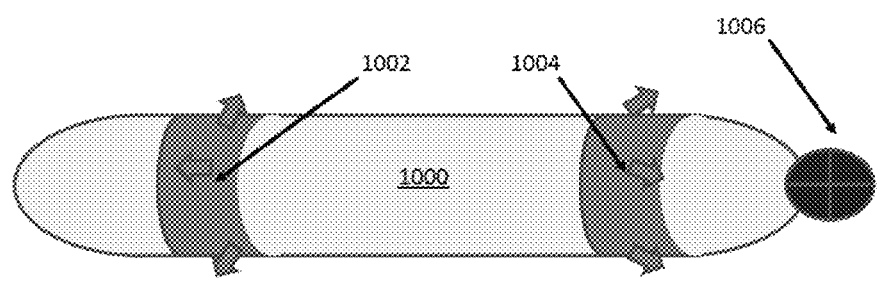
FIG. 10 is a diagram showing a electrokinetic nanothruster used as a maneuvering thruster on an underwater vehicle.

Referring now to FIGS. 9 and 10, two example scenarios for the construction of an underwater vehicle are shown using the above disclosed ekT. FIG. 9 shows an underwater vehicle 900 that uses ekTs as a primary propulsion system. Underwater vehicle 900 includes a reservoir 902 connected to an intake 908. As the underwater vehicle 900 moves, water enters intake 908 and fills reservoir 902. An array of nanomembranes 904 may contain thousands to billions of nanochannels that connect the reservoir with directional nozzles 906. Nanomembranes 904 may be comprised of a porous material such as anodic aluminum oxide or similar material. Using principles of electrokinetics, electrodes on either side of membranes 904 produce an electric field in the nanochannels and an electro-osmotic flow is generated from the reservoir to an array of thrusters 910. The electrodes may be imprinted or otherwise attached to the array of membranes 904. Any method known in the art for providing electrodes to create the necessary magnetic field may be employed. The outtake is controlled through the directional nozzles to provide thrust out of the array of thrusters 910.

Referring now to FIG. 10, a second scenario of an underwater vehicle 1000 is shown utilizing conventional primary propulsion 1006, but using ekTs as maneuvering thrusters 1002, 1004. The maneuvering thrusters 1002, 1004 of underwater vehicle 1000 operate in a similar fashion as described above in reference to FIG. 9. Maneuvering thrusters 1002, 1004 may provide precise lateral and vertical movement in concert with conventional primary propulsion 1006.

In the underwater scenarios discussed above, gas production at high voltages from electrolysis of the water at the electrodes may present a limitation on the amount of voltage applied across the nanochannels which will limit the magnitude of the electric field. One method of overcoming this limitation is fast pulsing of the voltage. When the voltage is alternated between a positive and negative voltage at a rate faster than the reaction time of the oxygen and hydrogen in the water, gas production does not occur. The flow rate of the ionic solution can be maintained by proper timing of the voltage pulses. Since the flow rate is dependent on the product of voltage and time, a high flow rate can be maintained by applying a voltage in one direction that is substantially higher than the alternating opposite voltage.

Figure 11:
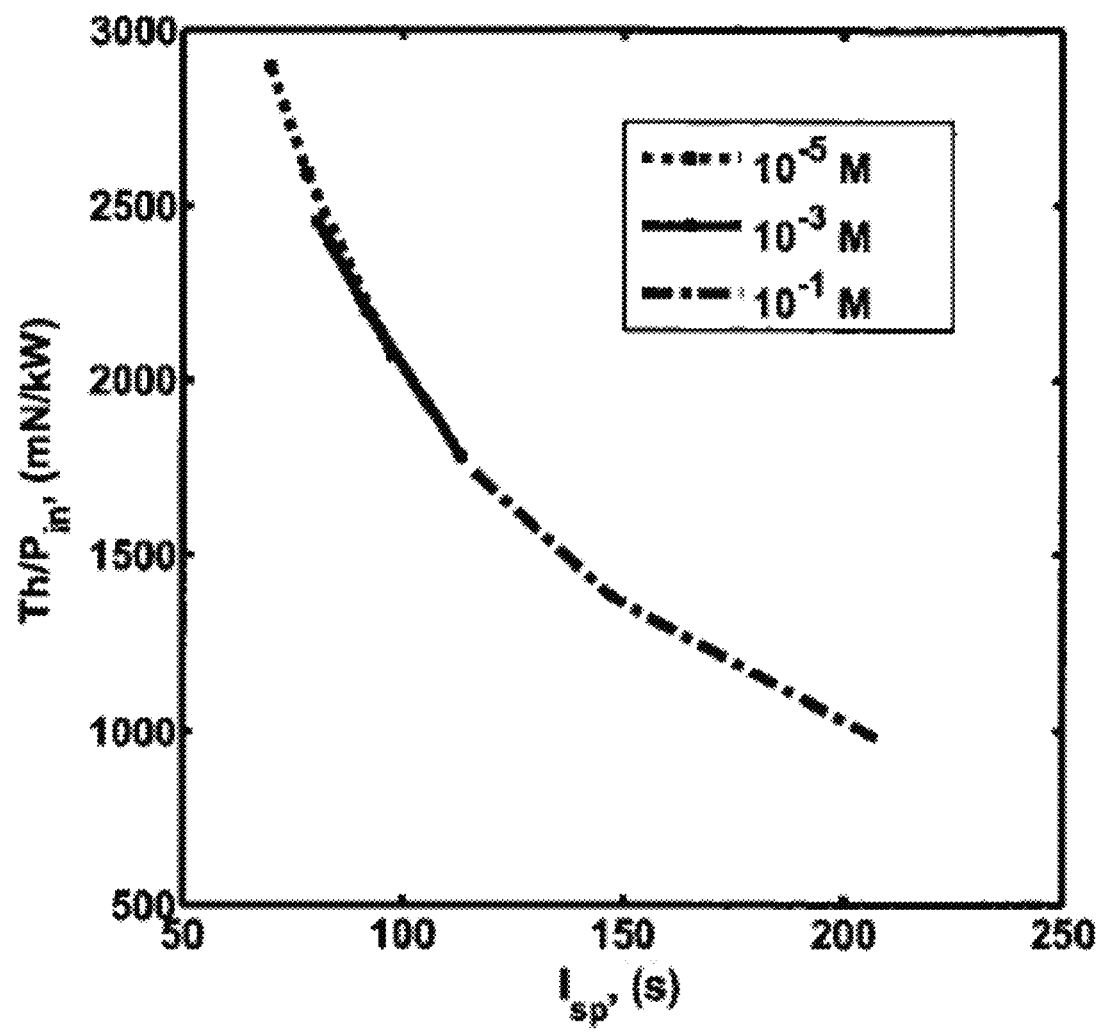
FIG. 11 is a graph showing example thrust-to-power ratios as a function of specific impulse.

Optimum design conditions for space ekTs can be identified by varying molarity, surface charge density and slip length. These three variables are directly related with channel material and solution composition which is chosen dining design process to ensure that the system will operate close to the desired optimal conditions. To show the propulsion capabilities of the ekT, the thrust-to-power ratio is plotted as a function of the specific impulse $I_{sp}$ in FIG. 11. The $Th/P_{in}$ results shown in this plot correspond to optimal electrokinetic operating conditions obtained by designing an ekT that combines the appropriate surface charge density and slip length for a specific molarity resulting in $X_{ek}$ close to 100%. The plot is computed at a constant potential drop of 500 V, and shows that high molarities lead to high thrust and specific impulse values, whereas low molarities are needed in order to obtain higher thrust-to-power-in ratios for the highest efficiencies. This provides important information for the choice of the design parameters of a propulsion system in order to obtain the best performance possible of the ekT emitters for a specific space mission.

To take full advantage of ekT for space propulsion, efficient emitters have to be designed. Optimal selection of channel material, channel dimensions and electrolyte composition are selected to get the optimal $\sigma$ and b. External control of the electrokinetic thrust, specific impulse, and electrokinetic efficiency may be obtained by changing the total potential drop, $\Delta V$, while thrust-to-power ratio remains constant during the entire $\Delta V$ domain. Therefore, when designing one emitter, curves like the one shown in FIG. 11 can be developed that take into consideration optimal electrokinetic efficiency, thrust-to-power ratio, and specific impulse. If more thrust or higher thrust control is required, arrays with large number of emitters can be constructed, which would make possible to vary thrust levels incrementally while maintaining efficiency and specific impulse at their optimal values by simply varying the number of emitters in use at any one time.

Figure 12:
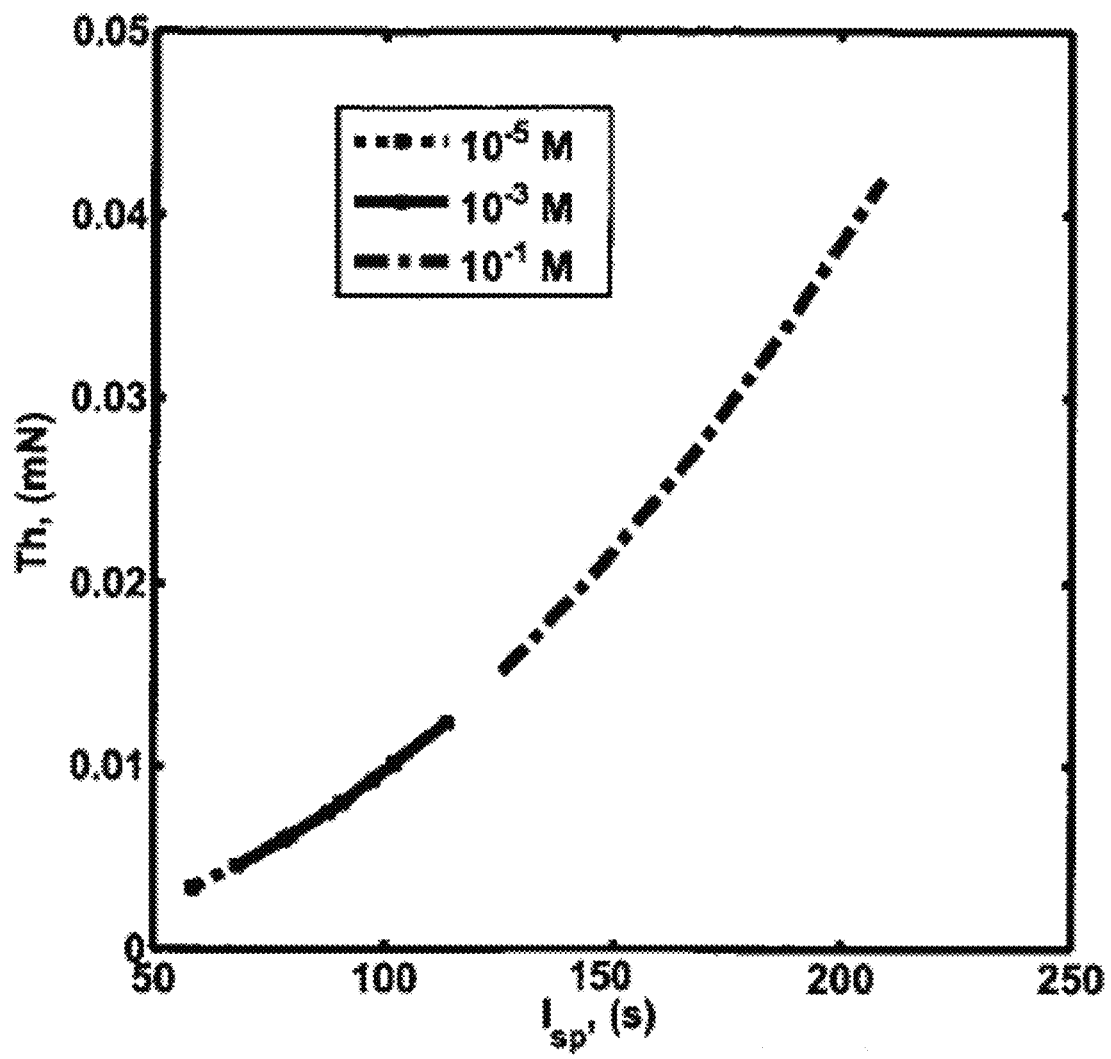
FIG. 12 is a graph showing example thrust results as a function of specific impulse.

The operation of a single emitter is shown in FIG. 12. The emitter thrust is increased by changing the total potential drop from 300 V to 500 V. The increase in the total potential drop results in an increase of the $I_{sp}$. Each curve in FIG. 12 represents a different molarity and they show the expected Th vs. $I_{sp}$ that would be obtained when the total potential drop is varied. All the calculations have been done for the same nano-channel geometry and surface condition which allows studying the effect of the electrolyte properties on the ekT performance. The electrokinetic variables for each molarity curve have been selected to ensure close to 100% efficiency, and their values are: (1) $M=10^{-1}$ with b=27 nm and $\sigma=-138.6$ mC/m$^2$, (2) $M=10^{-3}$ with b=34 nm and $\sigma=-58$ mC/m$^2$, and (3) $M=10^{-5}$ with b=37 nm and $\sigma=-45.2$ mC/m$^2$.

In terms of performance, the scenario in FIG. 12 shows that the single ekT emitter designed can deliver a thrust from 5 to 43 µN and a $I_{sp}$ from 60 to 210 s. The operational range of the emitter is determined by the solution properties and by the designed slip length for a maximum potential drop of 500 V. To cover the entire range of thrust operation shown in FIG. 10, it would require a system may change the molarity on the fly by loading the solute and the solution separately to prepare the mixture in situ. Furthermore, by developing an array composed of thousands of emitters, the ekT has the potential to be easily scalable and a flexible propulsion system that will provide a wide range of thrusts for different mission scenarios, with very high efficiencies and very high thrust control.

In a scenario, the specifications for example EKTs are as follows: $ekT_1$, with 2280 nanochannels and 100 nm wide; and $ekT_2$, with 9350 nanochannels and 100 nm wide. Full details for these two example ekT configurations are shown in Table 2. They were designed to obtain electrokinetic efficiencies close to 100%. They are controlled by varying the potential from 300 V to 500 V. The ek emitters' specific impulse increases with the applied potential but the thrust-to-power ratio remains constant. The theoretical analysis shows that the ek thrusters modeled may be capable of delivering thrust with efficiency close to 100%. A comparison with colloidal thrusters shows that EKT may be used for a similar Th and $I_{sp}$ operation range but in a more efficient manner.

TABLE 2

Design characteristics for a two space electrokinetic thruster designs.

| | Th (mN) | *Th (µN) | *$P_{in}$ (mW) | Is (s) | Number of emitters | $\sigma$ (C/m$^2$) | w (nm) | h (nm) | Slip b (nm) | Solution (M/L) | $\chi$ (%) |
|---|---|---|---|---|---|---|---|---|---|---|---|
| $ekT_1$ | 95.83 | 42.02 | 43.4 | 209.0 | 2280 | −0.139 | 100 | 100 | 27 | 1.00E−01 | 99.17 |
| $ekT_2$ | 95.83 | 10.25 | 5.2 | 103.2 | 9350 | −0.050 | 100 | 100 | 35.4 | 1.00E−05 | 99.16 |

*Values are for a single ek emitter.

From the orbital control of micro-satellites, which require high precision, low thrust and exceedingly efficient engines, to the fulfillment of longer duration missions, which entail stricter power constraints and tighter mass limitations, the ekT offers a broad operational range that makes it a very promising system for a variety of space missions. An ekT is particularly ideal for power-limited, time-insensitive missions that require large overall changes in spacecraft velocities and small orbital corrections and attitude control.

One of the main advantages of ekT lies in their high achievable performance with micro size dimensions, greatly reducing the overall thruster weight and dedicated space on the vehicle. Further, since the ekT has a low power requirement, this propulsion system puts a low draw on the space vehicle's power system, which could either allow the power to be exploited in greater amounts by the payload of the space vehicle or enable the entire power system to be reduced in scale. This could in turn reduce the space vehicle's mass and profile. Finally, since the EKT compact size would make the construction of arrays with hundreds to billions of thrusters contained within a small volume possible, it becomes trivial to establish a redundant propulsion system on any space vehicle design, while only negligibly increasing the craft's weight. There is also a key advantage in using many emitters of low current instead of a few of large current; low power emitters are more efficient, have smaller divergences angles and in general they produce thrust in a more collimated and controlled manner.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The foregoing examples and description of the preferred embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and script of the invention, and all such variations are intended to be included within the scope of the following claims.

I claim:

1. A vehicle propulsion system having an electrokinetic actuator: an array of channels of the vehicle propulsion system, each channel having an inlet and an outlet; a reservoir containing an ionic liquid solution; a first electrode proximate to the inlet and a second electrode proximate to the outlet; a voltage source, connected to the first and second electrodes, configured to apply a voltage across a length of the array of channels to generate an electric field parallel to each channel, wherein the electric field causes an electro-osmotic flow of ions from the reservoir to the outlet producing electrokinetic thrust at the outlet.

2. The vehicle propulsion system-according to claim 1, wherein each channel has a length of 100 nm to one micron.

3. The vehicle propulsion system-according to claim 2, wherein the electric field is $5 \times 10^5$ to $7 \times 10^8$ volts per meter.

4. The vehicle propulsion system-according to claim 3, wherein the ionic liquid solution is an aqueous solution.

5. The vehicle propulsion system-according to claim 3, wherein the array of channels comprises a porous metal oxide membrane.

6. The vehicle propulsion system-according to claim 5, wherein the porous metal oxide membrane comprises anodic aluminum oxide.

7. The vehicle propulsion system-according to claim 3, wherein each channel in the array of channels has a length of substantially 800 nm.

8. The vehicle propulsion system-according to claim 3, wherein the array of channels comprises more than one million nanochannels.

9. The vehicle propulsion system-according to claim 3, wherein the vehicle propulsion system-forms a primary propulsion system for an underwater vehicle.

10. The vehicle propulsion system-according to claim 3, wherein the vehicle propulsion system forms a maneuvering propulsion system for an underwater vehicle.

11. The vehicle propulsion system-according to claim 3, wherein the electric field is $1 \times 10^8$ to $7 \times 10^8$ volts per meter.

12. The vehicle propulsion system-according to claim 11, wherein the array of channels comprises an emitter array.

13. The vehicle propulsion system-according to claim 11, wherein the array of channels comprises more than one hundred emitters.

14. The vehicle propulsion system-according to claim 11, wherein the vehicle propulsion system forms a primary propulsion system for a space vehicle.

15. The vehicle propulsion system-according to claim 11, wherein the vehicle propulsion system forms a maneuvering propulsion system for a space vehicle.

16. The vehicle propulsion system-according to claim 11, wherein a velocity of the ions at a channel wall is not zero.

17. A method of producing thrust using an vehicle propulsion system having an electrokinetic actuator, the method comprising: applying a voltage between a first electrode proximate to an inlet of a channel and a second electrode proximate to an outlet of the channel to generate an electric field that is parallel to the channel and is $5\times10^5$ to $7\times10^8$ volts per meter; introducing an ionic solution into the channel from a reservoir connected to the inlet of the channel, wherein ions in the ionic solution form an electric double layer along walls of the channel; and varying a concentration of the ionic solution and the voltage to cause an electro-osmotic flow of ions from the inlet to the outlet to produce thrust at the outlet.

18. The method according to claim 17, wherein a length of the channel is 100 nm to one micron.

19. The method of claim 18, wherein the channel comprises an array of channels.

* * * * *